United States Patent
Zong et al.

(10) Patent No.: US 11,674,598 B2
(45) Date of Patent: Jun. 13, 2023

(54) SEAL AND METHOD OF FORMING

(71) Applicant: SAINT-GOBAIN PERFORMANCE PLASTICS CORPORATION, Solon, OH (US)

(72) Inventors: Zong Zong, Southborough, MA (US); Nafih Mekhilef, Shrewsbury, MA (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 148 days.

(21) Appl. No.: 17/104,150

(22) Filed: Nov. 25, 2020

(65) Prior Publication Data

US 2021/0156476 A1 May 27, 2021

Related U.S. Application Data

(60) Provisional application No. 62/941,270, filed on Nov. 27, 2019.

(51) Int. Cl.
*F16J 15/3284* (2016.01)
*F16J 15/3204* (2016.01)

(52) U.S. Cl.
CPC ....... *F16J 15/3284* (2013.01); *F16J 15/3204* (2013.01)

(58) Field of Classification Search
CPC .... F16J 15/00; F16J 15/16; F16J 15/50; F16J 15/52; F16J 15/32; F16J 15/322; F16J 15/3204; F16J 15/3216; F16J 15/3284
USPC ........................................................ 277/549
See application file for complete search history.

(56) References Cited

U.S. PATENT DOCUMENTS

| | | | |
|---|---|---|---|
| 7,658,387 B2* | 2/2010 | Park | F16J 15/3244 277/576 |
| 9,702,462 B2* | 7/2017 | Celik | F16J 15/108 |
| 2005/0054753 A1* | 3/2005 | Hayashida | C09K 3/1009 523/223 |
| 2007/0244212 A1 | 10/2007 | Lehmann | |
| 2010/0116422 A1 | 5/2010 | Vaideeswaran et al. | |
| 2010/0117310 A1 | 5/2010 | Celik et al. | |
| 2013/0337218 A1* | 12/2013 | Liu | B29C 66/4322 156/110.1 |
| 2014/0087115 A1 | 3/2014 | Celik et al. | |
| 2018/0057633 A1* | 3/2018 | Dolog | C08K 3/042 |

FOREIGN PATENT DOCUMENTS

| DE | 102005054612 A1 | 5/2007 |
|---|---|---|
| JP | 2000290409 A | 10/2000 |
| JP | 2003049951 A | 2/2003 |

(Continued)

OTHER PUBLICATIONS

Wikipedia, functioanl group, 2022 (Year: 2022).*

(Continued)

*Primary Examiner* — Nathan Cumar
(74) *Attorney, Agent, or Firm* — Abel Schillinger, LLP; Robert N Young

(57) ABSTRACT

A seal can include a body including a thermoplastic material and a filler material including a fluoropolymer. The fluoropolymer can include a modified fluoropolymer. The body can include an elongation-at-break of at least 3%. In an embodiment, the seal can include a seal ring, wherein the body of the seal ring can include a weld.

18 Claims, 8 Drawing Sheets

(56) References Cited

FOREIGN PATENT DOCUMENTS

| KR | 20040068558 A | 7/2004 |
| WO | 2007146381 A2 | 12/2007 |
| WO | 2017102818 A1 | 6/2017 |

OTHER PUBLICATIONS

Solid lubricants, 2017 (Year: 2017).*
International Search Report and Written Opinion for PCT/US2020/062135, dated Mar. 18, 2021, 13 pages.
"PTFE and PEEK Compounds for Oil and Gas Applications" Copyright 2014, Parker Hannifin Corporation, 2 pages.
Taeger, Antje et al., "Evidence of chemical compatibilization reaction between poly(etherether ketone) and irradiation-modified poly(tetrafluoroethylene)," High Performace Polymers, 2014, vol. 26(2), pp. 188-196.
BIEGLO: Cooperation with perfluorence GmbH on CoPEEK-PTFE-Compounds, https://www.k-online.de/de/News/BIEGLO_Zusammenarbeit_mit_der_perfluorence_GmbH_bei_CoPEEK-PTFE-Compounds, Aug. 16, 2013, accessed Nov. 24, 2020, 2 pages.

* cited by examiner

SEAL AND METHOD OF FORMING

CROSS-REFERENCE TO RELATED APPLICATION(S)

This application claims priority under 35 U.S.C. § 119(e) to U.S. Provisional Patent Application No. 62/941,270, filed Nov. 27, 2019, by Zong ZONG, et al., entitled "SEAL AND METHOD OF FORMING," which is assigned to the current assignee hereof and incorporated herein by reference in its entirety for all purposes.

FIELD OF THE DISCLOSURE

This disclosure, in general, relates to seals including a thermoplastic material and a filler material and methods of forming the same.

BACKGROUND

Thermoplastic seals have been used in various industries. PTFE filled thermoplastic polymers are desirable for their wear characteristics and low friction. However, PTFE filled thermoplastic polymers, such as PTFE filled PEEK, may be difficult to use with typical heat welding processes. Specifically, the welded portion of seals formed with PTFE filled PEEK often shows a reduced elongation-at-break as compared to those formed with unfilled PEEK. As large diameter seals (e.g., having diameters of at least 600 mm) cannot be easily made using molding techniques, heat welding processes are used in forming large diameter seals, which makes PTFE filled thermoplastic polymers less suitable for forming large diameter seals by heat welding processes. The industry continues to demand seals with improved properties and performance.

BRIEF DESCRIPTION OF THE DRAWINGS

Embodiments are illustrated by way of example and are not limited in the accompanying figures.

Figure 1:
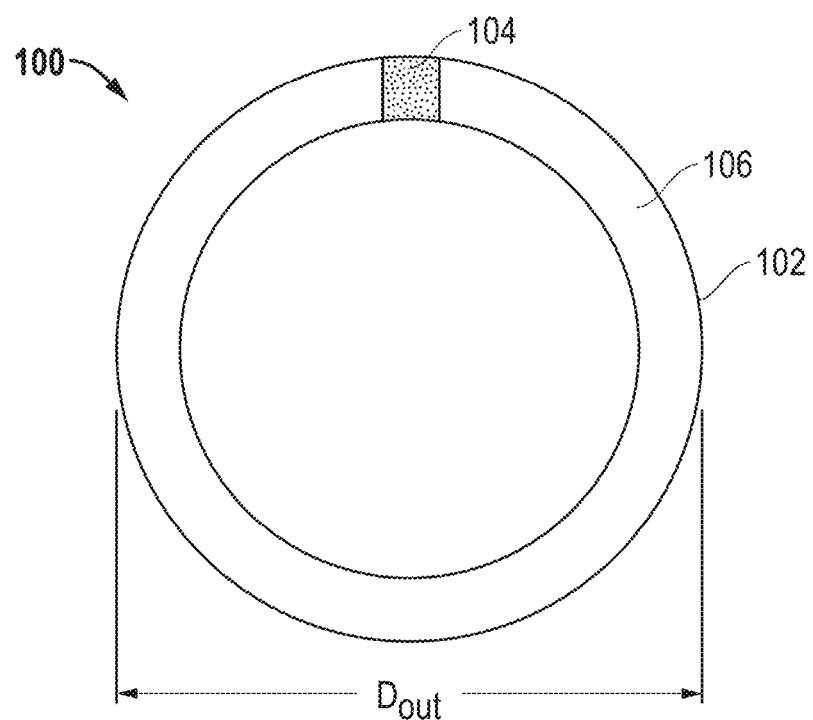
FIG. 1 includes an illustration of a plan view of a seal ring according to an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments relate to seals. The seals can include a body including a thermoplastic material and a filler material including a fluoropolymer. The seals can include seal rings, back-up rings, or another seal device. In an embodiment, the entire body of the seal can consist essentially of a blend of the thermoplastic material and the filler material. In another embodiment, the body can include a weld. The seals can have improved performance and properties, such as elongation-at-break of at least 3%, such as at least 5%, a coefficient of friction of less than 0.41, such as less than 0.40, or at most 0.37, or a combination thereof.

Further embodiments relate to a process of forming the seal. The process can include forming a blend of the thermoplastic material and the filler material including the fluoropolymer and forming the seal body including the blend. The blend can include fluoropolymer particles uniformly dispersed in a matrix of the thermoplastic material. In an embodiment, the particles can have a major dimension having an average size of at most 10 microns, such as at most 5 microns. In another embodiment, the particles can have an absolute value of a particle size standard deviation of at most 70% of the average major dimension of the particles. The process can facilitate formation of seals having improved properties, and maybe particularly suitable for forming large diameter seal rings using a heat welding process.

Referring to FIG. 1, a representative seal is illustrated. A seal ring 100 includes a body 102 including a weld 104 forming a closed loop. In an embodiment, the entire body 102 can be made of a material including a thermoplastic material and filler. Particularly, the filler can include a fluoropolymer. In a particular embodiment, the body 102 can consist essentially of the filler filled thermoplastic material.

In an embodiment, the thermoplastic material can include an engineering or high performance thermoplastic polymer. For example, the thermoplastic material may include a polymer including, such as a polyketone, polyaramid, athermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, a liquid crystal polymer, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a poly ketone, a thermoplastic polyimide, a polyetherimide, a polyphenylene sulfide, a polyether sulfone, a polysulfone, a polyamideimide, a derivative thereof, or a combination thereof. In a further example, the thermoplastic material includes poly ketone, such as poly ether ether ketone (PEEK), polyether ketone, polyether ketone ketone, polyether ketone ether ketone ketone, a derivative thereof, or a combination thereof. An example thermoplastic fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THY), polychlorotrifluoroethylene (PCTFE), ethylene tetrafluoroethylene copolymer (ETFE), ethylene chlorotrifluoroethylene copolymer (ECTFE), or any combination thereof. An exemplary liquid crystal polymer includes aromatic polyester polymers, such as those available under tradenames XYDAR® (Solvay), VECTRA® (Hoechst Celanese), SUMIKOSUPER™ or EKONOL™ (Sumitomo Chemical), DuPont HX™ or DuPont ZENITE™ (E.I. DuPont de Nemours), RODRUNfM (Unitika), GRANLAR™ (Grandmont), or any combination thereof. In an additional example, the thermoplastic polymer may be ultra high molecular weight polyethylene. In a particular implementation, the thermoplastic polymer can include polyketone (PK), polyetherketone (PEK), polyetheretherketone (PEEK), polyetherketoneketone (PEKK), polyetheretherketoneketone (PEEKK), polyetherketoneetherketoneketone (PEKEKK), or any combination thereof. In a more particular implementation, the thermoplastic material can consist essentially of polyetheretherketone (PEEK).

In a further embodiment, the body 102 can include a particular content of the thermoplastic material that can facilitate improved formation and improved performance and properties of the seal. In an aspect, the body 102 can include at least 35 wt % of the thermoplastic material for a total weight of the body, such as at least 40 wt %, at least 45 wt %, at least 50 wt %, at least 52 wt %, at least 55 wt %, at least 58 wt %, at least 60 wt %, at least 65 wt %, at least 70 wt %, at least 73 wt %, at least 75 wt %, at least 80 wt %, or at least 85 wt % for a total weight of the body 102. In another aspect, the body 102 can include at most 95 wt % of the thermoplastic material for a total weight of the body 102, at most 90 wt %, at most 85 wt %, at most 80 wt %, at most 75 wt %, at most 70 wt %, at most 65 wt %, at most 60 wt %, or at most 55 wt % for a total weight of the body 102. Moreover, the body 102 can include a content of the thermoplastic material in a range including any of the minimum and maximum percentages noted herein.

In an embodiment, the filler can include a fluoropolymer including a modified fluoropolymer. In a particular embodiment, the fluoropolymer can consist essentially of the modified fluoropolymer. In an aspect, the modified fluoropolymer can include modified tetrafluoroethylene-hexafluoropropylene (FEP), a modified perfluoroalkoxyethylene (PFA), a modified polyethylenetetrafluoroethylene (ETFE), or any combination thereof. In an example, the fluoropolymer can include modified fluoropolymer selected from the group consisting of tetrafluoroethylene-hexafluoropropylene (FEP), a modified perfluoroalkoxyethylene (PFA), a modified polyethylenetetrafluoroethylene (ETFE). In a particular example, the filler can include a fluoropolymer consisting essentially of modified PTFE, modified PFA, or a combination thereof. In another aspect, the modified fluoropolymer can include a functionalized fluoropolymer. In an example, the modified fluoropolymer can include an oxygen-containing functional group, such as a carbonyl group. In another example, the modified fluoropolymer can include a functional group including —COOH. In a particular example, the modified fluoropolymer can consist essentially of functionalized fluoropolymer. In a more particular example, the fluoropolymer can consist essentially of functionalized fluoropolymer. In another example, the modified fluoropolymer may include low molecular weight PTFE. In yet another example, the modified fluoropolymer may not include low molecular weight PTFE.

In a further aspect, the modified fluoropolymer can include a Fourier Transform Infrared Spectroscopy (referred to herein as "FTIR") absorbance peak at a particular wavelength that can facilitate improved formation and improved performance and properties of the seal. For example, the modified fluoropolymer can have a FTIR peak at a wavelength from 1785 $cm^{-1}$ to 1795 $cm^{-1}$. In another instance, the modified fluoropolymer may include a FTIR peak at a wavelength from 1770 $cm^{-1}$ to 1780 $cm^{-1}$, from 1800 $cm^{-1}$ to 1820 $cm^{-1}$, or both. In a further instance, the modified fluoropolymer may include a FTIR peak at a wavelength from 1879 $cm^{-1}$ to 1890 $cm^{-1}$, from 1540 $cm^{-1}$ to 1550 $cm^{-1}$, or both. A skilled artisan will appreciate that the modified fluoropolymer can include FTIR peaks at any of the wavelengths noted herein or any combination thereof. In a particular instance, the modified PTFE may not have a FTIR peak at a wavelength from 1770 $cm^{-1}$ to 1780 $cm^{-1}$ or from 1800 $cm^{-1}$ to 1820 $cm^{-1}$. In a more particular instance, the modified PTFE may not have a FTIR peak at a wavelength from 1770 $cm^{-1}$ to 1780 $cm^{-1}$ and may not have a FTIR peak at a wavelength from 1800 $cm^{-1}$ to 1820 $cm^{-1}$. As used herein, the wavelength of the FTIR peak can be the average wavelength of at least two FTIR analysis of the modified fluoropolymer or the seal body.

In another embodiment, the body 102 can include a particular amount of the modified fluoropolymer that can facilitate improved formation and improved performance and properties of the body. For example, the body can include at least 4 wt % of the modified fluoropolymer for a total weight of the body, at least 5 wt %, at least 6 wt %, at least 7 wt %, at least 8 wt %, at least 10 wt %, at least 12 wt %, at least 15 wt %, at least 20 wt %, at least 25 wt %, at least 30 wt %, at least 35 wt %, at least 40 wt %, or at least 45 wt % of the modified fluoropolymer for a total weight of the body. In another instance, the body can include body at most 40 wt % of the modified fluoropolymer for a total weight of the body, such as at most 35 wt %, at most 30 wt %, at most 25 wt %, at most 20 wt %, at most 18 wt %, at most 16 wt %, at most 15 wt %, at most 14 wt %, or at most 12 wt % of the modified fluoropolymer for a total weight of the body 102. Moreover, the content of the modified fluoropolymer can be in a range including any of the minimum and maximum percentages noted herein. For example, the body 102 can include a content of the modified fluoropolymer in a range from 4 wt % to 40 wt % or in a range from 4 wt % to 25 wt %.

In another embodiment, the body 102 can include a particular ratio ($W_{TP}/W_F$) of the content of the thermoplastic material ($W_{TP}$) to the content of the modified fluoropolymer ($W_F$) that can facilitate improved formation and improved performance and properties of the seal ring. For example, the ratio ($W_{TP}/W_F$) of the thermoplastic material to the modified fluoropolymer can be at least 1, at least 2, at least 3, at least 4, at least 5, or at least 6. In another example, the ratio ($W_{TP}/W_F$) can be at most at most 10, at most 9, at most 8, at most 7, or at most 6. Moreover, the ratio ($W_{TP}/W_F$) can be in a range including any of the minimum and maximum vales noted herein.

In another embodiment, the filler can further include a material, such as an organic material, an inorganic material, or a combination thereof, that is different from the fluoropolymer. In an aspect, the filler can include a solid lubricant. In another aspect, the filler can include alumina ($Al_2O_3$), silica ($SiO_2$), calcium carbonate ($CaCO_3$), titanium oxide ($TiO_2$), tungsten disulfide ($WS_2$), molybdenum disulfide ($MoS_2$), graphite, expanded graphite, graphene, boron nitride (BN), aluminum nitride (AlN), talc, calcium fluoride ($CaF_2$), cerium fluoride ($CeF_3$), a stearate including calcium stearate ($C_{36}H_{70}CaO_4$), potassium stearate ($C_{18}H_{35}KO_2$), or zinc stearate ($C_{36}H_{70}O_4Zn$), or any combination thereof. In a further aspect, the filler can include fibers including, such as aramid carbon fiber, glass fiber, basalt, or any combination thereof. In an embodiment, the body can include such filler material in a content of at least 1 wt %, such as at least 2 wt %, at least 5 wt %, at least 10 wt %. Alternatively or additionally, such filler material may be at most 30 wt %, at most 20 wt %, or at most 10 wt %. It is to be appreciated such filler material can be in range including any of the minimum and maximum percentages noted herein.

In an embodiment, the body 102 can include a total content of all the filler materials for a total weight of the body 102 that can facilitate improved formation and improved performance and properties of the seal ring. In an aspect, the total content of all the filler materials can be at least 5 wt %, at least 7 wt %, at least 9 wt %, at least 11 wt %, at least 15 wt %, at least 18 wt %, at least 20 wt %, at least 25 wt %, at least 30 wt %, at least 35 wt %, at least 40 wt %, at least 45 wt %, at least 50 wt %, at least 55 wt % for the total weight of the body 102. In another aspect, the total content of all the filler materials can be at most 70 wt %, at most 65 wt %, at most 62 wt %, at most 60 wt %, at most 58 wt %, at most 55 wt %, at most 50 wt %, at most 46 wt %, at most 43 wt %, at most 40 wt %, at most 36 wt %, at most 33 wt %, at most 30 wt %, at most 25 wt %, or at most 20 wt % for a total weight of the body. Moreover, the total content of all the filler materials can be in a range including any of the minimum and maximum percentages noted herein.

As illustrated in FIG. 1, the body 102 can include an outer diameter $D_{out}$. In an example, the outer diameter $D_{out}$ can be at least 0.2 meters, at least 0.6 meter, at least 1.0 meters, or at least 1.3 meters. In another instance, the outer diameter $D_{out}$ can be at most 50 meters, at most 40 meters, at most 30 meters, or at most 20 meters. In another instance, the outer diameter $D_{out}$ can be at most 10 meters, at most 8 meters, at most 6 meters, at most 5 meters, at most 3 meters, at most 2.5 meters, or at most 2.2 meters. In another example, the outer diameter $D_{out}$ can be within a range including any of the minimum and maximum values noted herein. After reading the instant application, a skilled artisan would understand that the body can be formed including a diameter that is suitable for desired applications. A skilled artisan would further understand that the body can be formed to have even bigger or smaller outer diameters than the values noted in embodiments herein to suit applications of the seal rings.

Notably, the body 102 can have an improved elongation-at-break. In an embodiment, the body 102 can include an elongation-at-break of at least 3%, such as at least 5%, at least 6%, at least 7%, at least 10%, at least 12%, at least 15%, at least 18%, or at least 20%. Alternatively or additionally, the elongation-at-break can be at most 40%, at most 35%, at most 30%, at most 25%, at most 20%, or at most 18%. Moreover, the elongation-at-break can be in a range including any of the minimum and maximum percentages noted herein. As used herein, the elongation-at-break is determined in accordance with ASTM D638-08, "Standard Test Method for Tensile Properties of Plastics".

In another embodiment, the body 102 can include a coefficient of friction of less than 0.40, such as at most 0.39, at most 0.38, at most 0.37, at most 0.36, at most 0.34, at most 0.32, at most 0.31, at most 0.3, at most 0.28, at most 0.26, at most 0.24, at most 0.22, or at most 0.2. Alternatively or additionally, the coefficient of friction can be at least 0.05, at least 0.1, at least 0.15, at least 0.2, at least 0.22, at least 0.25, at least 0.28, or at least 0.3. Moreover, the coefficient of friction can be in a range including any of the minimum and maximum values noted herein. As used herein, the coefficient of friction is determined in accordance with ASTM G137-97, "Standard Test Method for Ranking Resistance of Plastic Materials to Sliding Wear Using a Block-on-Ring Configuration", using the conditions described below.

A block sample of the seal is formed having the dimension noted in ASTM G137-97. The block is compressed against an oscillating steel ring under a constant load. The steel ring has a diameter of 35 mm and Ra of 0.3 to 0.4 μm. A Block-On-Ring tribometer is used to conduct a dry test under the conditions disclosed in Table 1 below.

TABLE 1

| | |
|---|---|
| Oscillating angle | 360° |
| Constant load | 200N (Max. Pressure 51 MPa with concentrated load) |
| Speed | 12 rpm (linear velocity 42.5 mm/s) |
| Temperature | Room temperature (20 to 25° C.) |
| Duration | 848 minutes |

Figure 2:
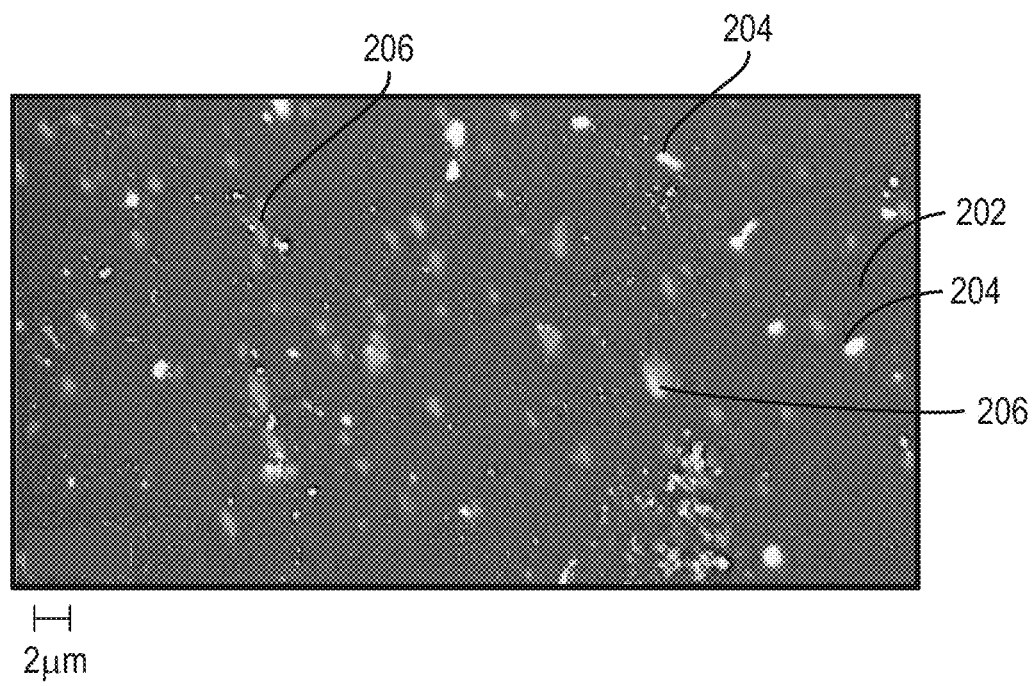
FIG. 2 includes an SEM image of a cross section of a seal body according to an embodiment.

FIG. 2 includes an SEM image of a cross section of the body 102. The body 102 can include a matrix 202 including the thermoplastic material and filler particles 204 and 206 evenly dispersed in the matrix 202. Filler particles can include the fluoropolymer material, and particularly, the modified fluoropolymer material. For example, as illustrated, filler particles can include fluoropolymer particles 206. Filler particles can further include particles 204 of a material that is not fluoropolymer, as described in embodiments herein. In an embodiment, the filler particles can consist essentially of particles of the modified fluoropolymer. In yet another embodiment, the filler particles can consist essentially of particles of the modified fluoropolymer and particles of a different filler material.

In an embodiment, the body 102 can include particles of the modified fluoropolymer having a particular average major dimension that can facilitate improved formation and properties and performance of the seal. Major dimension is intended to refer to major axis of a particle. Further as used herein, particles are analyzed by Image J to determine major dimensions of particles. Average major dimension is intended to refer to the average of the major dimensions of at least 50 particles in a greyscale SEM image of a cross section of the body. The greyscale SEM image has a contrast that distinguishes the particles over the background. Threshold is set automatically by Image J. Particles outside the range specified in the size field are not taken into consideration. The total of the major dimensions of at least 50 particles that are determined by Image J is divided by the number of particles to obtain the average major dimension.

In an aspect, the body 102 can include modified fluoropolymer particles having an average major dimension of at most 10 μm, at most 9 μm, at most 8 μm, at most 7 μm, at most 6 μm, at most 5 μm, at most 4 μm, at most 3 μm, at most 2 μm, at most 1 μm, at most 0.9 μm, or at most 0.8 μm. In another aspect, filler particles including the fluoropolymer material can have an average major dimension of at least 0.1 μm, at least 0.2 μm, at least 0.3 μm, at least 0.4 μm, at least 0.5 μm, at least 0.6 μm, at least 0.7 μm, at least 0.8 μm, at least 1 μm, or at least 2 μm. Moreover, the average major dimension of particles including the fluoropolymer material can be in a range including any of the minimum and maximum values noted herein.

In an embodiment, the body 102 can include particles of the modified fluoropolymer having a particular standard deviation of the major dimension that can facilitate improved formation and/or properties and performance of the seal. For example, the absolute value of the standard deviation can be at most 90% of the average major dimension, such as at most 80%, at most 70%, at most 65%, at most 60%, at most 55%, at most 50%, at most 45%, at most 40%, or at most 35%. In another example, the absolute value of the standard deviation of the particle major dimension can be at least 1%, at least 5%, at least 7%, at least 10%, at least 12%, at least 15%, or at least 18 of the major dimension. In a further example, the body can include the modified fluoropolymer particles including the absolute value of the standard deviation of the major dimension in a range including the minimum and maximum percentages noted herein.

In an embodiment, the body 102 can include a rod 106, such as an extruded rod. In an exemplary implementation, the rod 106 can be heated, bent, and welded at the ends to form the seal ring 100, as described in more details later in this disclosure.

Figure 3:
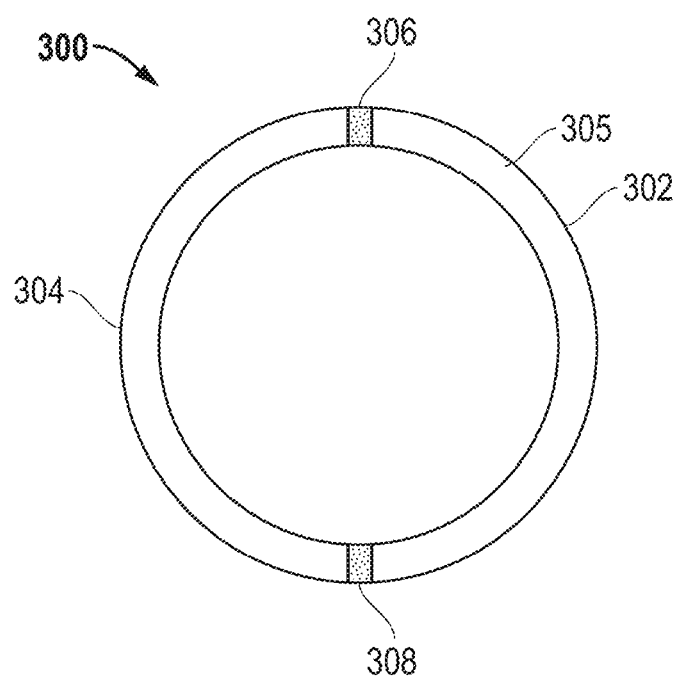
FIG. 3 includes an illustration of a plan view of a seal ring according to another embodiment.

FIG. 3 includes an illustration of another exemplary seal. The seal ring 300 includes a body 305 including a plurality of rods 302 and 304 joined at the welds 306 and 308. In another embodiment, the seal body can include at least 3, at least 5, or more rods. In another embodiment, the seal body can include a plurality of welds, such as at least 2, at least 3, at least 4, or at least 5 welds, for joining a plurality of components of the body, such as rods. In one embodiment, the seal ring may not include a weld.

Figure 4:
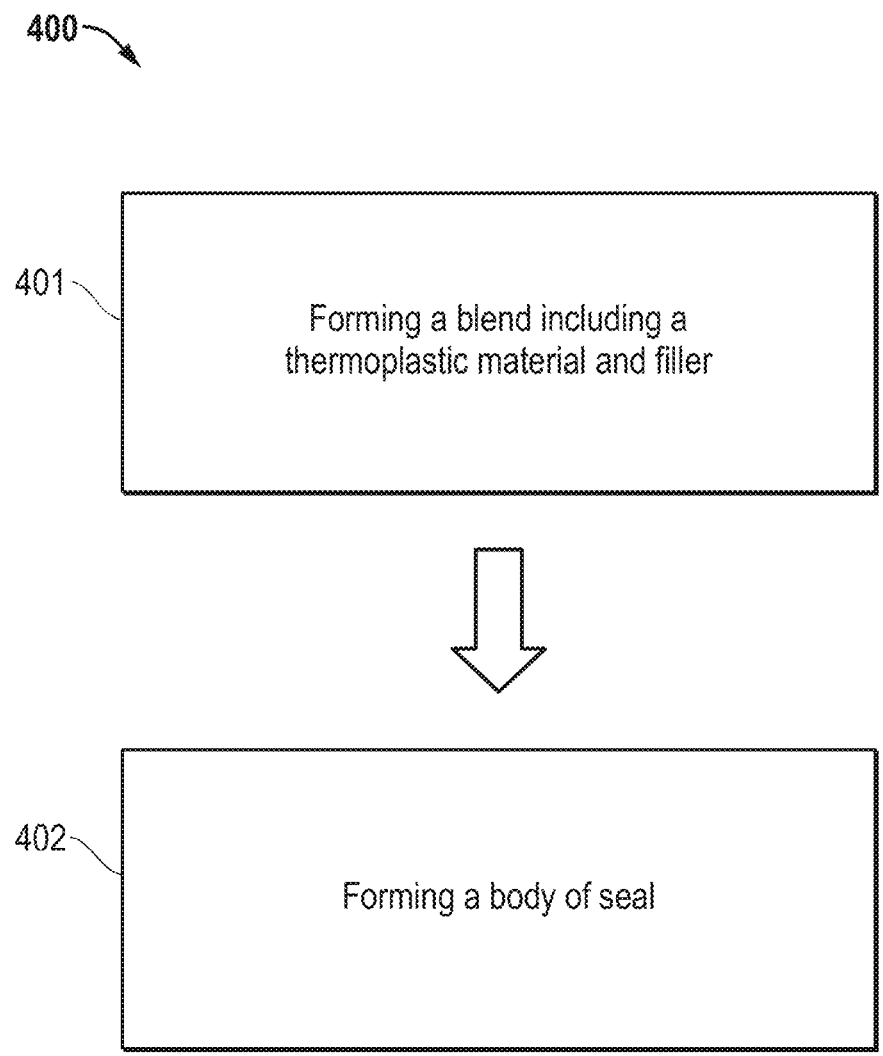
FIG. 4 includes flow chart illustrating a process according to an embodiment.

FIG. 4 includes a flowchart illustrating an exemplary process 400 for forming the seal. The process can start at block 401, forming a blend including the thermoplastic material and filler. A mixing device can be used to facilitate mixing of the thermoplastic material and filler. In an exemplary implementation, the thermoplastic material and filler may be fed into the twin screw extruder to form the blend. The filler and thermoplastic material may be added sequentially or at the same time. In an instance, different filler materials may be mixed before the thermoplastic material is added.

In a further aspect, forming the blend can include heating the thermoplastic material and filler. For instance, the materials can be heated at a temperature in a range from at least 250° C. to above the melting point of the thermoplastic material or the fluoropolymer. In a further instance, heating may be performed at a temperature less than 400° C., such as at most 390° C., at most 380° C., at most 370° C., at most 360° C., or at most 350° C. In a particular instance, heating may be performed in different heating zones in a temperature range from 250° C. to 374° C. Depending on the speed of the extruder, heating in different heating zones may take 3 minutes to 45 minutes, such as 5 minutes to 15 minutes. An exemplary extrusion speed can be in a range of 0.5 inches/min to 12 inches/min depending on the sizes of diameters or widths of extrudates.

In another aspect, forming the blend can include compounding the thermoplastic material and filler. In an instance, compounding can be performed at a temperature that is at least the melting point of the thermoplastic material. In another instance, compounding can be performed at a temperature less than 372° C., such as at most 370° C., at most 365° C., at most 362° C., at most 360° C., at most 358° C., or at most 357° C. In still another instance, compounding can be performed at a temperature of at least 343° C., such as at least 345° C., at least 348° C., at least 350° C., at least 352° C., at least 354° C., or at least 356° C. Moreover, compounding can be performed at a temperature in a range including any of the minimum and maximum values noted herein.

In a further instance, compounding can be performed at a pressure of at least 45 psi, such as at least 70 psi, at least 100 psi, at least 120 psi, at least 150 psi, at least 170 psi, at least 200 psi, at least 210 psi, or at least 230 psi. In another instance, compounding can be performed at a pressure of at most 350 psi, at most 330 psi, at most 310 psi, at most 280 psi, at most 260 psi, or at most 240 psi. Moreover, compounding can be performed at a pressure within a range including any of the minimum and maximum values noted herein.

In another instance, compounding can be performed at a screw speed greater than 60 rpm, such as at least 80 rpm, at least 100 rpm, at least 130 rpm, at least 150 rpm, at least 180 rpm, at least 210 rpm, at least 230 rpm, or at least 250 rpm. In a further instance, the screw speed can be at most 350 rpm, such as at most 330 rpm, at most 310 rpm, at most 290 rpm, at most 270 rpm, or at most 250 rpm. Moreover, compounding can be performed at a screw speed in a range including any of the minimum and maximum values noted herein.

In another aspect, forming the blend can include extruding the compounded mixture of the thermoplastic material and filler. In an example, the extrudate can be cooled, such as in air or a water bath, and pelletized.

The process 400 can continue at block 402, forming a body of a seal. In an aspect, the pellets can be compressed, shaped, and/or heated to form a body of a seal. For example, the seal body can be formed using, such as extrusion molding, injection molding, hot compression molding, or the like. In an exemplary implementation, pellets can be melted and extruded to form a rod that can be further treated to form a seal ring. In another embodiment, the rod may be further machined to take the desired form.

Figure 5:
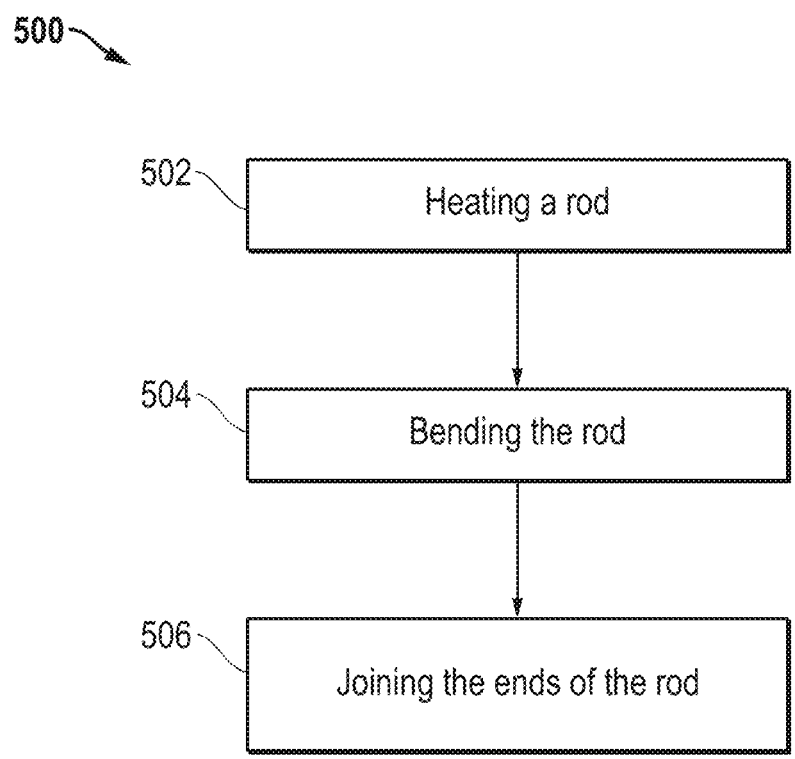
FIG. 5 includes flow chart illustrating a process according to another embodiment.

FIG. 5 includes an illustration of a process of forming a seal ring using a rod. In an aspect, the rod can be a straight rod. Further, the rod may have a cross-section, such as a circular cross-section or a polygonal cross-section, such as a polygon with at least four sides. In particular, the polygon may be a rectangle or square.

The forming process 500 can include heating a rod at block 502. In a particular aspect, heating can be conducted at a temperature greater than the glass transition temperature and less than the melting point of the thermoplastic material.

At block 504, the heated rod can be bent, maybe with aid of a suitable tool, to a desired shape. In an example, the rod may be applied between a three-roller system to aid bending. In another example, the rod may be bent and placed into a mold to complete bending the rod to a desired shape. In a further example, the rod may be clamped to a circular bender and bent through the rotation of the bender.

As an alternative to heating and bending, the rod may be extruded in the form of an arc and the ends of the arc joined to form the body of a seal ring. In another alternative, arcs may be cut from sheets of material, such as extruded sheets or compression molded sheets, and the ends of the arcs joined.

The process 500 can continue at block 506, joining the ends of the rod. In an aspect, the ends can be joined through hot melt welding, injection molding, adhesive, ultrasonic welding, or any combination thereof. In a particular aspect, the ends of the rod are joined through hot melt welding. In an example, hot melt welding may include applying heat to the ends of the rod and pressing the ends together once melted. In instances, melted ends of different rods may be joined to form a body including a plurality of rods and welds, such as the body 305 illustrated in FIG. 3.

In an embodiment, after the ends are joined, a semi-finished body of a seal may be formed. The semi-finished body can be further treated to form the body of a seal. In an aspect, the semi-finished body may be annealed. In an example, annealing can be performed at a temperature greater than the glass transition temperature of the thermoplastic material. In a further instance, annealing may be performed for a period of at least 2 hours. In a further aspect, the semi-finished body may be further machined or processed to form a body of a seal ring. US Pat. App. No. 2010/0116422 by Vaideeswaran et al., for "Method of Forming Large Diameter Thermoplastic Seal," disclosing a method of forming a seal, is hereby incorporated by reference.

Figure 6:
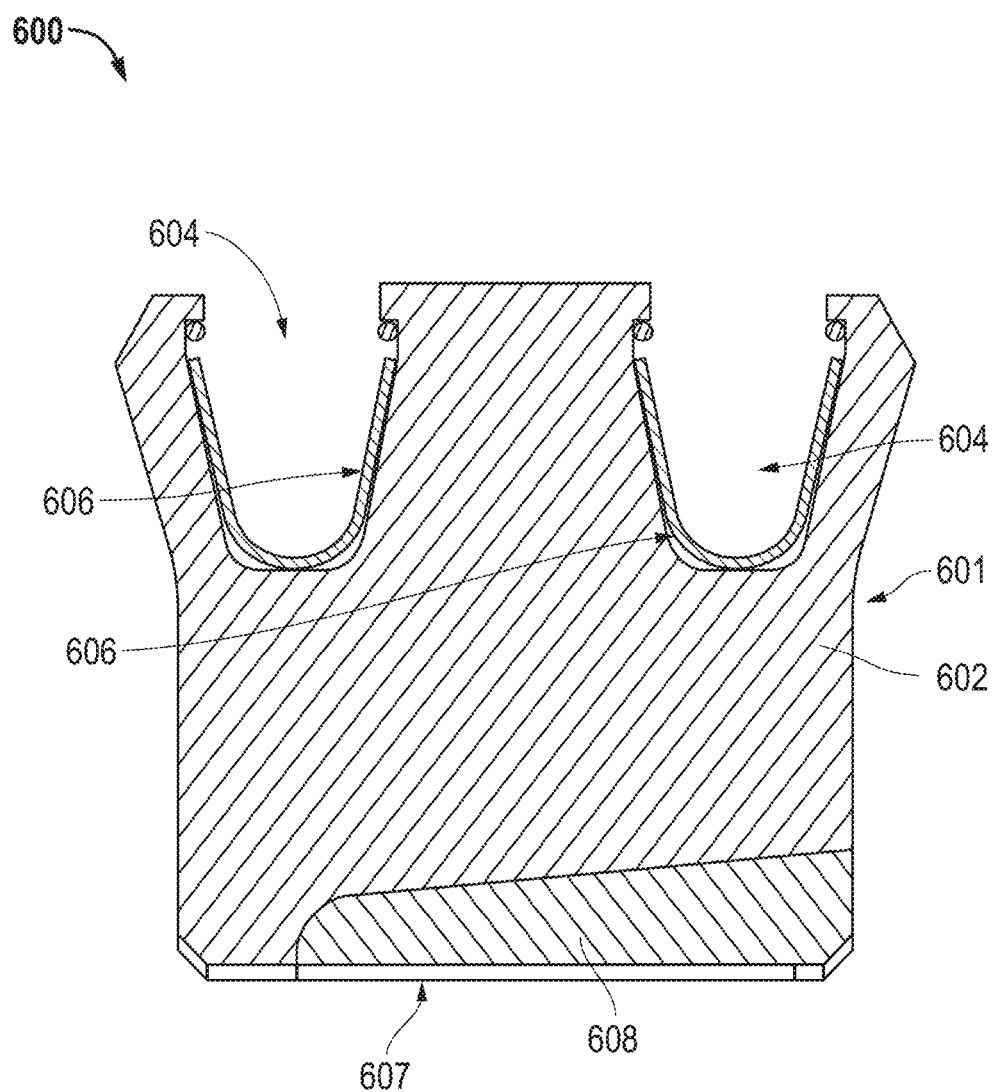
FIG. 6 includes an illustration of a cross section of a seal according to another embodiment.
Figure 7A:
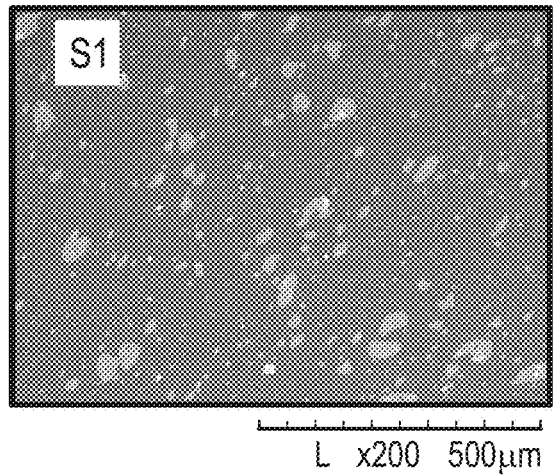
FIGS. 7A to 7D include SEM images of samples.
Figure 7B:
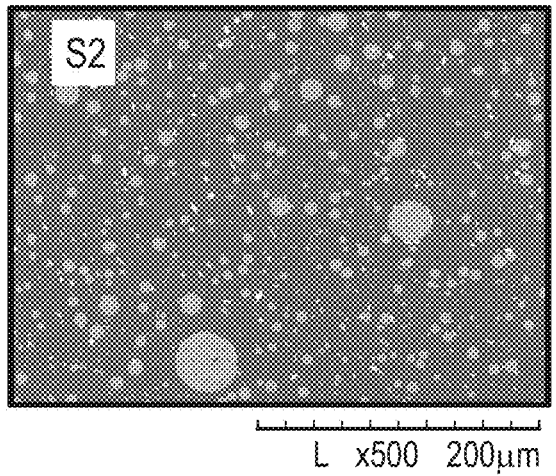
Figure 7C:
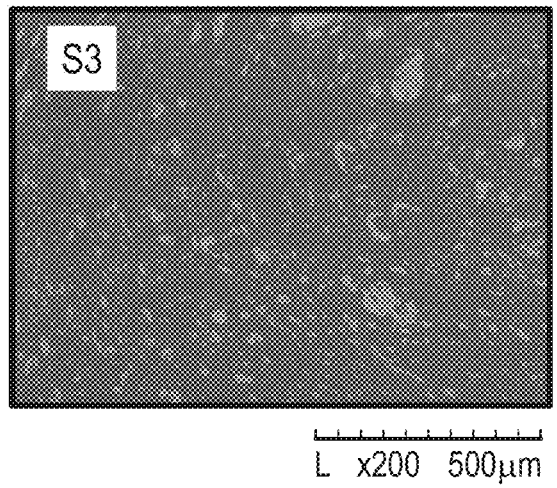
Figure 7D:
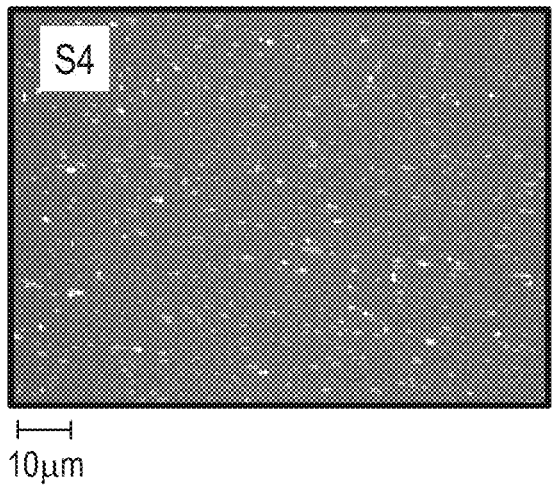

In an embodiment, the body of the seal can be a closed loop, such as the body 102 or 305. FIG. 6 includes an illustration of a cross section of a seal 600 according to another embodiment. The seal 600 can be a spring energized seal 601 and a back up ring 607. The back up ring 607 can include a body 608 having any of the features noted with respect to the body 102 and 305. The seal 601 can include a body 602 having grooves 604 and springs 606 placed within the grooves 604. The body 602 can have any of the features noted with respect to the body 102 and 305.

In an exemplary application, the seals of embodiments herein can be used in an oil or drilling rig, such as a turret swivel rig. In another exemplary application, the seals may be placed in contact with a material including a polymer, metal, or any combination thereof. For instance, the back up ring 607 may be placed in contact with steel in a turret swivel rig.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1

A seal ring, comprising a body including a weld, wherein an entire body is formed of a material comprising a thermoplastic material and a filler material including a fluoropolymer, wherein the body comprises an elongation-at-break of at least 3%.

Embodiment 2

A seal ring, comprising a body including a weld, wherein an entire body is formed of a material comprising a thermoplastic material and a filler material, wherein the filler material comprises particles including a fluoropolymer, wherein the particles comprise a major dimension including a length or a width, wherein an average size of the major dimension is at most 10 μm.

Embodiment 3

The seal ring of Embodiment 1 or 2, wherein the body has an elongation-at-break of at least 5%, at least 6%, at least 7%, at least 10%, or at least 15%.

Embodiment 4

The seal ring of any one of Embodiments 1 to 3, wherein the body has an elongation-at-break of at most 40%, at most 35%, at most 30%, or at most 25%.

Embodiment 5

The seal ring of any one of Embodiments 1 to 4, wherein the body comprises filler particles having an average size of a major dimension of at most 10 μm, at most 9 μm, at most 8 μm, at most 7 μm, at most 6 μm, at most 5 μm, at most 4 μm, at most 3 μm, at most 2 μm, or at most 1 μm.

Embodiment 6

The seal ring of any one of Embodiments 1 to 5, wherein the body comprises filler particles having an average size of a major dimension of at least 0.1 μm, at least 0.3 μm, or at least 0.5 μm.

Embodiment 7

The seal ring of any one of Embodiments 1 to 6, wherein the fluoropolymer comprises a modified fluoropolymer.

Embodiment 8

The seal ring of Embodiment 7, wherein the fluoropolymer consists essentially of modified fluoropolymer.

Embodiment 9

The seal ring of Embodiment 7 or 8, wherein the modified fluoropolymer comprises a functional group, wherein the modified fluoropolymer is covalently bonded to the thermoplastic material.

Embodiment 10

The seal ring of any one of Embodiments 7 to 9, wherein the modified fluoropolymer comprises a modified polytetrafluoroethylene (PTFE), a modified tetrafluoroethylene-hexafluoropropylene (FEP), a modified perfluoroalkoxyethylene (PFA), a modified polyethylenetetrafluoroethylene (ETFE), or any combination thereof.

Embodiment 11

The seal ring of any one of Embodiments 1 to 10, wherein the fluoropolymer consists essentially of modified PTFE, modified PFA, or any combination thereof.

Embodiment 12

The seal ring of any one of Embodiments 1 to 11, wherein the seal comprises a diameter of at least 0.2 meters, at least 0.6 meter, at least 1.0 meters, or at least 1.3 meters.

Embodiment 13

The seal ring of any one of Embodiments 1 to 12, wherein the seal comprises a diameter of at most 50 meters, at most 40 meters, at most 30 meters, at most 20 meters, at most 10 meters, at most 9 meters, at most 8 meters, at most 6 meters, at most 5 meters, at most 4 meters, at most 3 meters, at most 2.5 meters, or at most 2.2 meters.

Embodiment 14

The seal ring of any one of Embodiments 1 to 13, wherein the thermoplastic material comprises polyarylketone, polyimide, aliphatic and aromatic polyamide (PA or PPA), polyester, polyetherimide (PEI), polyamideimide (PAI) liquid crystal polymer (LCP), polybenzimidazole (PBI), ultra high molecular weight polyethylene (UHMWPE), polysulfones (PPS, PES, PPSU, PESU), polytetrafluoroethylene perfluoroether (PFA), polychloro-trifluoroethylene (PCTFE), polyethylenetetrafluoroethylene (ETFE), polyvinyledene fluoride (PVDF) Polyvinylfluoride (PVF), polyvinyledene fluoride-hexafluoropropylene (VF2-HFP), polyketone (PK), polyetherketone (PEK), or any combination thereof.

Embodiment 15

The seal ring of any one of Embodiments 1 to 14, wherein the thermoplastic material comprises polyketone (PK), polyetherketone (PEK), or a combination thereof.

Embodiment 16

The seal ring of any one of Embodiments 1 to 15, wherein the thermoplastic material comprises polyetheretherketone (PEEK), polyetherketoneketone (PEKK), polyetheretherketoneketone (PEEKK), polyetherketone (PEK), polyetherketoneetherketoneketone (PEKEKK), or any combination thereof.

Embodiment 17

The seal ring of any one of Embodiments 1 to 16, wherein the thermoplastic material consists essentially of polyetheretherketone (PEEK).

Embodiment 18

The seal ring of any one of Embodiments 1 to 17, wherein the fluoropolymer is a first filler, wherein the body further comprises a second filler including an organic material, an inorganic material, or a combination thereof.

Embodiment 19

The seal ring of Embodiment 18, wherein the second filler comprises a solid lubricant.

Embodiment 20

The seal ring of Embodiment 18 or 19, wherein the second filler comprises alumina ($Al_2O_3$), silica ($SiO_2$), calcium carbonate ($CaCO_3$), titanium oxide ($TiO_2$), tungsten disulfide ($WS_2$), molybdenum disulfide ($MoS_2$), graphite, expanded graphite, graphene, boron nitride (BN), talc, calcium fluoride ($CaF_2$), cerium fluoride ($CeF_3$), a stearate including calcium stearate ($C_{36}H_{70}CaO_4$), potassium stearate ($C_{18}H_{35}KO_2$), or zinc stearate ($C_{36}H_{70}O_4Zn$), or any combination thereof.

Embodiment 21

The seal ring of Embodiment 19 or 20, wherein the second filler comprises a fiber including aramid carbon fiber, glass fiber, basalt, or any combination thereof.

Embodiment 22

The seal ring of any one of Embodiments 1 to 21, wherein the seal body comprises at least 4 wt % of the fluoropolymer for a total weight of the body, at least 5 wt %, at least 6 wt %, at least 7 wt %, at least 8 wt %, at least 10 wt %, at least 12 wt %, at least 15 wt %, at least 20 wt %, at least 25 wt %, at least 30 wt %, at least 35 wt %, at least 40 wt %, or at least 45 wt % of the fluoropolymer for a total weight of the body.

Embodiment 23

The seal ring of any one of Embodiments 1 to 22, wherein the seal body comprises at most 50 wt % of the fluoropolymer for a total weight of the body, at most 45 wt %, at most 42 wt %, at most 40 wt %, at most 38 wt %, at most 35 wt %, at most 30 wt %, at most 25 wt %, or at most 20 wt % of the fluoropolymer for a total weight of the body.

Embodiment 24

The seal ring of any one of Embodiments 1 to 23, wherein the seal body comprises at least 35 wt % of the thermoplastic material for a total weight of the body, at least 40 wt %, at least 45 wt %, at least 50 wt %, at least 52 wt %, at least 55 wt %, at least 58 wt %, at least 60 wt %, at least 65 wt %, at least 70 wt %, at least 73 wt %, at least 75 wt %, at least 80 wt %, or at least 85 wt % for a total weight of the body.

Embodiment 25

The seal ring of any one of Embodiments 1 to 24, wherein the seal body comprises at most 95 wt % of the thermoplastic material for a total weight of the body, at most 90 wt %, at most 85 wt %, at most 80 wt %, at most 75 wt %, at most 70 wt %, at most 65 wt %, at most 60 wt %, or at most 55 wt % for a total weight of the body.

Embodiment 26

The seal ring of any one of Embodiments 1 to 25, wherein the seal body comprises a weight ratio of the thermoplastic material to the fluoropolymer, wherein the ratio is at least 1, at least 2, at least 3, at least 4, at least 5, or at least 6.

Embodiment 27

The seal ring of any one of Embodiments 1 to 26, wherein the seal body comprises a weight ratio of the thermoplastic material to the fluoropolymer, wherein the ratio is at most 10, at most 9, at most 8, at most 7, or at most 6.

Embodiment 28

The seal ring of any one of Embodiments 1 to 27, wherein the body comprises a rod.

Embodiment 29

The seal ring of Embodiment 28, wherein the rod comprises an extruded rod.

Embodiment 30

The seal ring of any one of Embodiments 1 to 29, wherein the seal body comprises a total content of the filler for a total weight of the body, wherein the total content is at least 5 wt %, at least 7 wt %, at least 9 wt %, at least 11 wt %, at least 15 wt %, at least 18 wt %, at least 20 wt %, at least 25 wt %, at least 30 wt %, at least 35 wt %, at least 40 wt %, at least 45 wt %, at least 50 wt %, at least 55 wt % for the total weight of the body.

Embodiment 31

The seal ring of any one of Embodiments 1 to 30, wherein the seal body comprises a total content of the filler for a total weight of the body, wherein the total content is at most 70 wt %, at most 65 wt %, at most 62 wt %, at most 60 wt %, at most 58 wt %, at most 55 wt %, at most 50 wt %, at most 46 wt %, at most 43 wt %, at most 40 wt %, at most 36 wt %, at most 33 wt %, at most 30 wt %, at most 25 wt %, or at most 20 wt % for a total weight of the body.

Embodiment 32

The seal ring of any one of Embodiments 1 to 31, wherein the seal body forms a closed loop.

Embodiment 33

The seal ring of any one of Embodiments 1 to 32, wherein the body comprises a coefficient of friction of less than 0.41, at most 0.39, at most 0.36, at most 0.34, at most 0.32, or at most 0.31, at most 0.30, at most 0.28, at most 0.26, at most 0.25, at most 0.23, at most 0.21, or at most 0.2.

Embodiment 34

An apparatus, comprising the seal ring of any one of Embodiments 1 to 33, wherein the seal is disposed at a sealing interface, wherein the seal is in contact with a metal surface, a polymeric surface, or both.

Embodiment 35

The seal ring or apparatus of any one of Embodiments 1 to 34, wherein the body comprises particles including the fluoropolymer, wherein the particles include a standard deviation of a major dimension of the particles, wherein the standard deviation is at most 90% of the major dimension, at most 80%, at most 70%, at most 60%, at most 50%, or at most 40% of the major dimension.

Embodiment 36

A seal ring, comprising a body including a weld, wherein an entire body is formed of a material comprising a thermoplastic material and a filler material including a fluoropolymer, wherein the fluoropolymer comprises a functionalized fluoropolymer.

Embodiment 37

The seal ring of Embodiment 36, wherein the body comprises particles of the functionalized fluoropolymers, wherein an average size of major dimensions of the particles is at most 10 µm, at most 9 µm, at most 8 µm, at most 7 µm, at most 6 µm, at most 5 µm, at most 4 µm, at most 3 µm, at most 2 µm, or at most 1 µm.

Embodiment 38

The seal ring of any one of Embodiments 36 to 37, wherein the body comprises particles of the functionalized fluoropolymers, wherein an average size of major dimensions of the particles is at least 0.1 µm, at least 0.3 µm, or at least 0.5 µm.

Embodiment 39

The seal ring of any one of Embodiments 36 to 38, wherein the body comprises particles of the functionalized fluoropolymer, wherein the particles include a standard deviation of a major dimension of the particles, wherein the standard deviation is at most 90% of the major dimension, at most 80%, at most 70%, at most 60%, at most 50%, or at most 40% of the major dimension.

EXAMPLES

Example 1

Welded dog bone samples were formed using blends of PEEK (obtained from Solvay) and modified PTFE fillers. The filler materials used to form blends S1 to S4 are described in Table 2 below. The blends were prepared in the manner described in embodiments herein. The welded dog bone samples were formed via injection molding. The contents of PEEK and modified PTFE fillers were the same for each blend.

TABLE 2

| Blend | Filler | D50 of filler material | Material |
|---|---|---|---|
| S1 | 1 | 4 to 6 microns | Irradiated low molecular weight PTFE |

TABLE 2-continued

| Blend | Filler | D50 of filler material | Material |
|---|---|---|---|
| S2 | 2 | 4 microns | Synthesized low molecular weight PTFE |
| S3 | 3 | 6 microns | Synthesized low molecular weight PTFE |
| S4 | 4 | 45 microns | Functionalized PTFE including carbonyl group |

FIGS. 7A to 7D include SEM images of the blends. As illustrated, modified PTFE particles are dispersed in the matrix of PEEK, and coalescing of filler particles can be observed in FIGS. 7A to 7C.

Each of blends S1 to S4 was used to form at least 3 welded dog bones. All the welded dog bones were tested for elongation-at-break and tensile strength according to ASTM D638-08 as noted in embodiments herein, and the average elongation-at-break and tensile strength is included in Table 3.

The average major dimension of the filler particles in each blend was determined by dividing the total of the major dimensions of 697 to 1033 of filler particles by the number of the filler particles that were analyzed by Image J as described in this disclosure.

TABLE 3

| Blend | Average Major Dimension (μm) | Standard Deviation (μm) | Average elongation-at-break | Tensile strength (MPa) |
|---|---|---|---|---|
| S1 | 6.7 | ±8.9 | 0.02% | 45 |
| S2 | 3.2 | ±3.2 | 0.7% | 39 |
| S3 | 12 | ±11 | 0.01% | 42 |
| S4 | 0.79 | ±0.24 | 15% | 88 |

Example 2

PEEK and filler 4 of Example 1 was blended at different weight percentages according to embodiments herein forming Samples S6 to S8. At least 3 welded dog bones were formed using each of the blends. 3 welded dog bones were formed with PEEK only (referred to as Sample CS5 in this Example). All the welded dog bones samples were tested for elongation-at-break and tensile strength according to embodiments herein. The compositions and properties and/or performance of the tested samples are included in Table 4.

TABLE 4

| Sample | PEEK content | Filler content | Average elongation-at-break | Tensile strength (MPa) | Co-efficient of friction |
|---|---|---|---|---|---|
| CS5 | 100 wt % | 0 | 156% | 85 | 0.47 |
| S6 | 94 wt % | 6 wt % | 15% | 88 | 0.36 |
| S7 | 88 wt % | 12 wt % | 12% | 81 | 0.36 |
| S8 | 82 wt % | 18 wt % | 3% | 38 | 0.36 |

Example 3

PEEK and filler 4 of Example 1 was blended to form Samples S9 and S10 using the conditions noted below. PEEK and filler 4 was fed into a twin screw extruder using the feed rate of 12.8 lbs/hr and 1.12 lbs/hr, respectively, for forming both Samples.

To form Sample S9, the materials were heated in different barrels having the temperatures noted in Table 5 and processed/extruded using the conditions noted in Table 6.

TABLE 5

Heating Conditions for Forming Sample S9

| | Zones | | | | | |
|---|---|---|---|---|---|---|
| | Z1 | Z2 | Z3 | Z4 | Z5 | Z6 |
| Set Point (° C.) | 273 | 343 | 370 | 370 | 350 | 350 |

TABLE 6

Process conditions for Forming Sample S9

| Motor RPM | Melt Temp (° C.) | Melt Pressure (PSI) | Motor Torque (%) |
|---|---|---|---|
| 250 | 356.354 | 233.228 | 44.42 |

To form Sample S10, heating and processing/extrusion conditions in Tables 7 and 8 were used.

TABLE 7

Heating Conditions for Forming Sample S10

| | Zones | | | | | | |
|---|---|---|---|---|---|---|---|
| | Z1 | Z2 | Z3 | Z4 | Z5 | Z6 | Z7 |
| Set Point (° C.) | 375 | 380 | 385 | 385 | 380 | 380 | 380 |

TABLE 8

Process conditions for Forming Sample S10

| Motor RPM | Melt Temp (° C.) | Melt Pressure (PSI) | Motor Torque (%) |
|---|---|---|---|
| 60 | 372 | 43.51 | 11 |

Figure 8A:
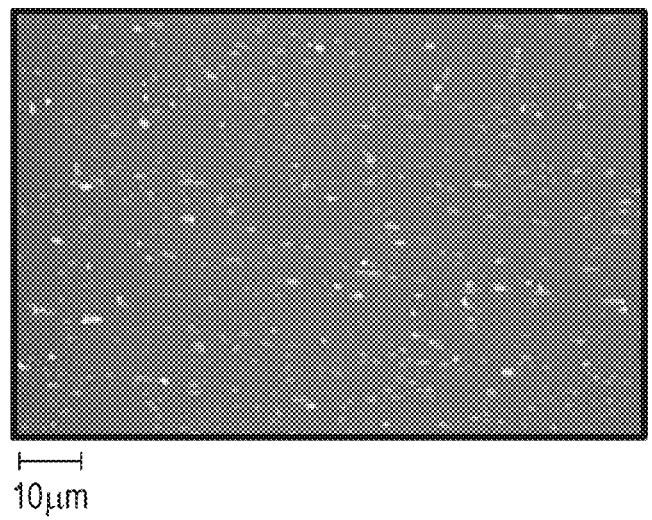
FIGS. 8A to 8B include SEM images of additional samples.
Figure 8B:
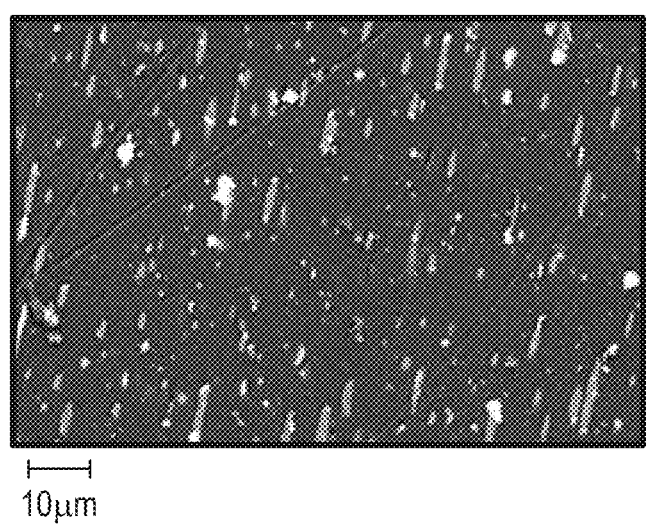

FIGS. 8A and 8B include SEM images of Samples S9 and S10, respectively, with a scale bar of 10 microns. As illustrated, filler 4 particles are dispersed in the matrix of PEEK. Sample S9 demonstrated smaller filler particles in general compared to Sample S10. Sample S9 had an average major dimension of 0.79 μm and a standard deviation of ±0.24 μm. Sample S10 had an average major dimension of 1.115 μm and a standard deviation of ±1.627 μm.

Welded dog bones were formed using Samples S9 and S10, respectively, and tested for elongation-at-break. Sample S9 had an average elongation-at-break of 15%, and Samples S10 had an average elongation-at-break of 9.4%.

Example 4

Welded dog bone samples were formed. A blend including 92 wt % of PEEK, 2 wt % of WS$_2$, and 6 wt % of filler 4 of Example 1 was prepared and used to form welded dog bone samples, referred to as Samples S11. Samples S12 were formed using the similar blend except filler 4 is replaced with another modified PTFE material, filler 5. Filler 5 is functionalized PTFE including —COOH functional group. The powder of filler 5 has the D50 of 5 microns.

The blends were formed using the conditions noted in Tables 3 and 4. Samples CS13 were formed using PEEK only. PEEK was purchased from Solvay under the commercial designation of 820 NT™.

Figure 9:
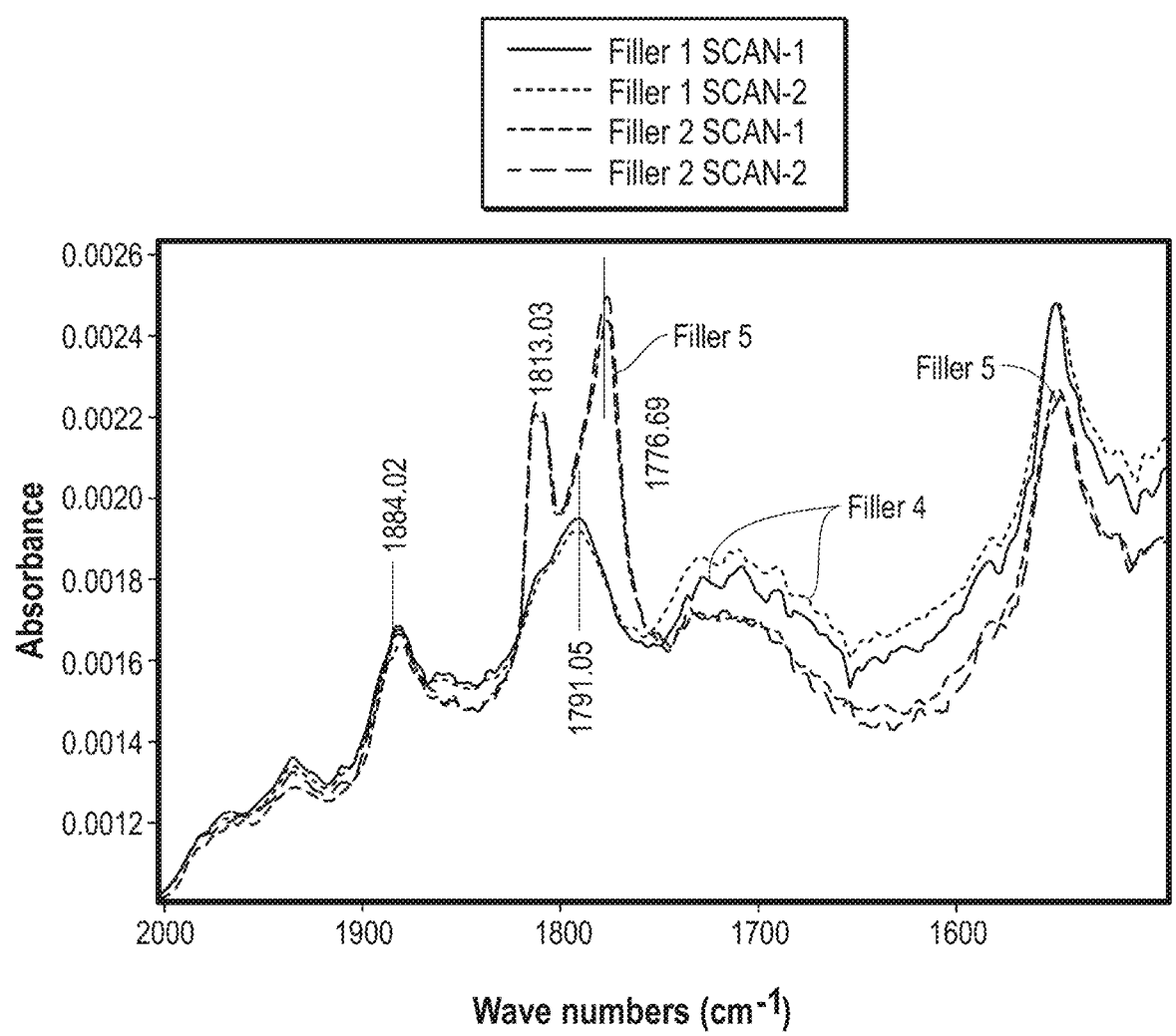
FIG. 9 includes a graph of FTIR readouts of filler samples.

FIG. 9 includes FTIR readouts of PTFE, filler 4, and filler 5, demonstrating different FTIR absorbance peaks between PTFE, filler 4 and filler 5. As noted in FIG. 9, two readouts of each filler material from separate analysis are included. Filler 4 had a distinct absorbance peak at the wavelength of 1791.05 cm$^{-1}$. Filler 5 demonstrated distinct absorbance peaks at the wavelengths of 1776.69 cm$^{-1}$ and 1813.03 cm$^{-1}$.

All the samples were tested for elongation-at-break and co-efficient of friction and average values are included in Table 9 below.

TABLE 9

| Sample | Average elongation-at-break | Average tensile strength (MPa) | Co-efficient of friction |
|---|---|---|---|
| S11 | 21% | 85 | 0.31 |
| S12 | 33% | 89 | 0.40 |
| CS13 | 104% | 88 | 0.41 |

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A seal ring, comprising a body including a weld, wherein an entire body is formed of a material comprising a thermoplastic material and a filler material, wherein:
   the thermoplastic material comprises one or more of polyarylketone, polyimide, aliphatic and aromatic polyamide (PA or PPA), polyester, polyetherimide (PEI), polyamideimide (PAI) liquid crystal polymer (LCP), polybenzimidazole (PBI), ultra high molecular weight polyethylene (UHMWPE), polysulfones (PPS, PES, PPSU, or PESU), polytetrafluoroethylene perfluoroether (PFA), polychloro-trifluoroethylene (PCTFE), polyethylenetetrafluoroethylene (ETFE), polyvinyledene fluoride (PVDF), Polyvinylfluoride (PVF), polyvinyledene fluoride-hexafluoropropylene (VF2-HFP), polyketone (PK), polyetherketone (PEK), polyetheretherketone (PEEK), polyetherketoneketone (PEKK), polyetheretherketoneketone (PEEKK), and polyetherketoneetherketoneketone (PEKEKK); and
   the filler material comprises particles including a fluoropolymer, wherein the particles comprise a major dimension, wherein an average size of the major dimension is at most 3 µm.

2. The seal ring of claim 1, wherein the body has an elongation-at-break of at least 3% and at most 40%.

3. The seal ring of claim 1, wherein the body comprises filler particles having an average size of a major dimension of at most 1 µm.

4. The seal ring of claim 1, wherein the fluoropolymer comprises a modified fluoropolymer.

5. The seal ring of claim 4, wherein the modified fluoropolymer comprises a modified polytetrafluoroethylene (PTFE), a modified tetrafluoroethylene-hexafluoropropylene (FEP), a modified perfluoroalkoxyethylene (PFA), a modified polyethylenetetrafluoroethylene (ETFE), or any combination thereof.

6. The seal ring of claim 1, wherein the fluoropolymer comprises a functional group.

7. The seal ring of claim 6, wherein the fluoropolymer is covalently bonded to the thermoplastic material.

8. The seal ring of claim 1, wherein the seal body comprises at least 4 wt % and at most 50 wt % of the fluoropolymer; and at least 35 wt % and at most 95 wt % of the thermoplastic material for a total weight of the body.

9. The seal ring of claim 1, wherein the average size of the major dimension is at least 0.1 microns.

10. An apparatus, comprising the seal ring of claim 1, wherein the seal is disposed at a sealing interface, wherein the seal is in contact with a metal surface, a polymeric surface, or both.

11. The seal ring of claim 1, wherein the filler material comprises the fluoropolymer in a content of at most 18 wt % and at least 4 wt % for a total weight of the body.

12. The seal ring of claim 1, wherein the fluoropolymer is a first filler, wherein the body further comprises a second filler including an organic material, an inorganic material, or a combination thereof.

13. The seal ring of claim 1, wherein the fluoropolymer consists essentially of modified PTFE, modified PFA, or any combination thereof.

14. The seal ring of claim 1, wherein the seal ring comprises a diameter of at least 0.2 meters.

15. The seal ring of claim 1, wherein the seal body comprises a coefficient of friction of less than 0.41.

16. The seal ring of claim 1, wherein the particles include a standard deviation of the major dimension of the particles, wherein the standard deviation is at most 90% of the major dimension.

17. The seal ring of claim 1, wherein the thermoplastic material comprises polyetheretherketone (PEEK), polyetherketoneketone (PEKK), polyetheretherketoneketone (PEEKK), polyetherketone (PEK), polyetherketoneetherketoneketone (PEKEKK), or any combination thereof.

18. The seal ring of claim 1, wherein the thermoplastic material comprises polytetrafluoroethylene perfluoroether (PFA).

* * * * *